Feb. 15, 1966   H. R. ROTTMANN   3,235,739
METHOD AND APPARATUS FOR INSPECTING CYLINDRICAL
OBJECTS BY PHOTOSENSITIVE MEANS
Filed Dec. 19, 1962   3 Sheets-Sheet 1
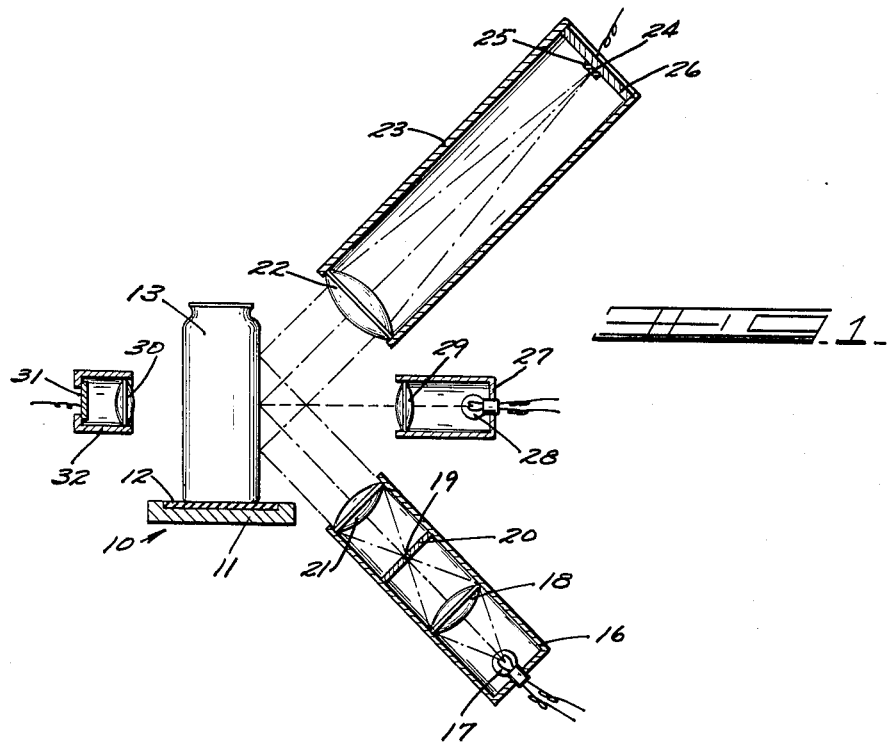
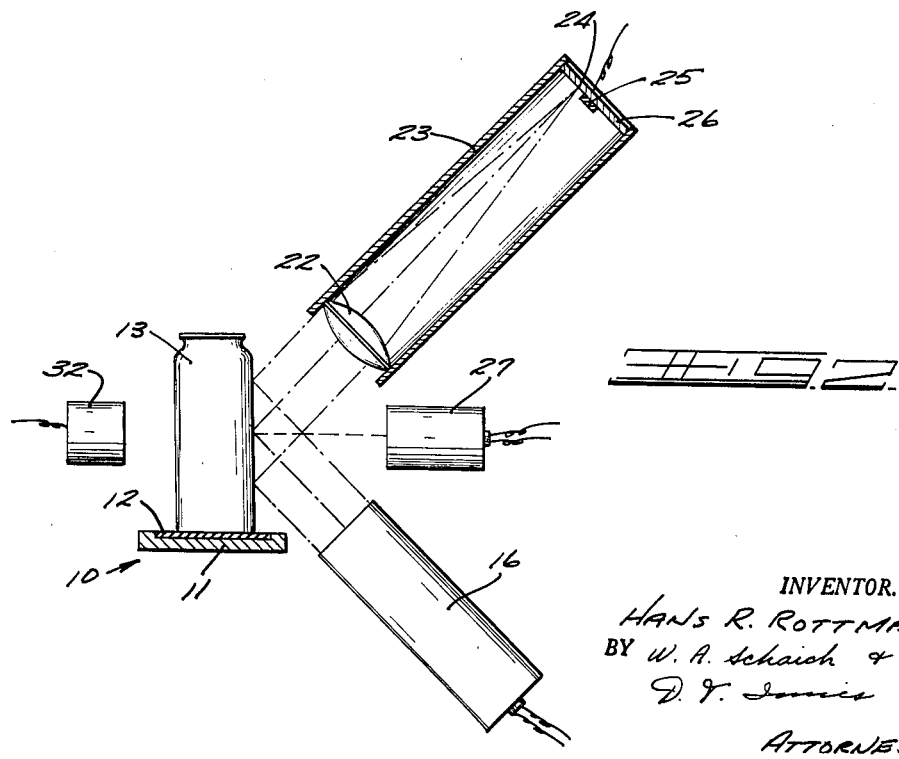
INVENTOR.
HANS R. ROTTMANN
BY W. A. Schaich &
D. T. Innes
ATTORNEYS

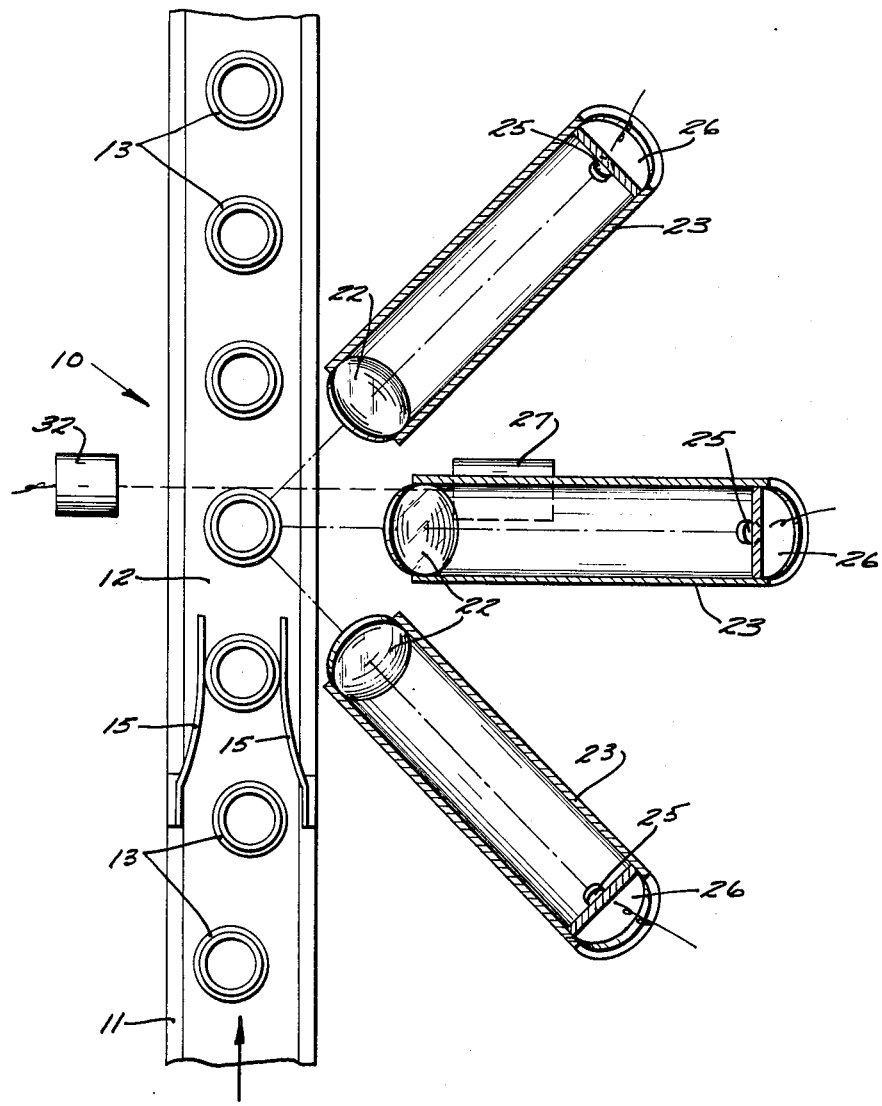

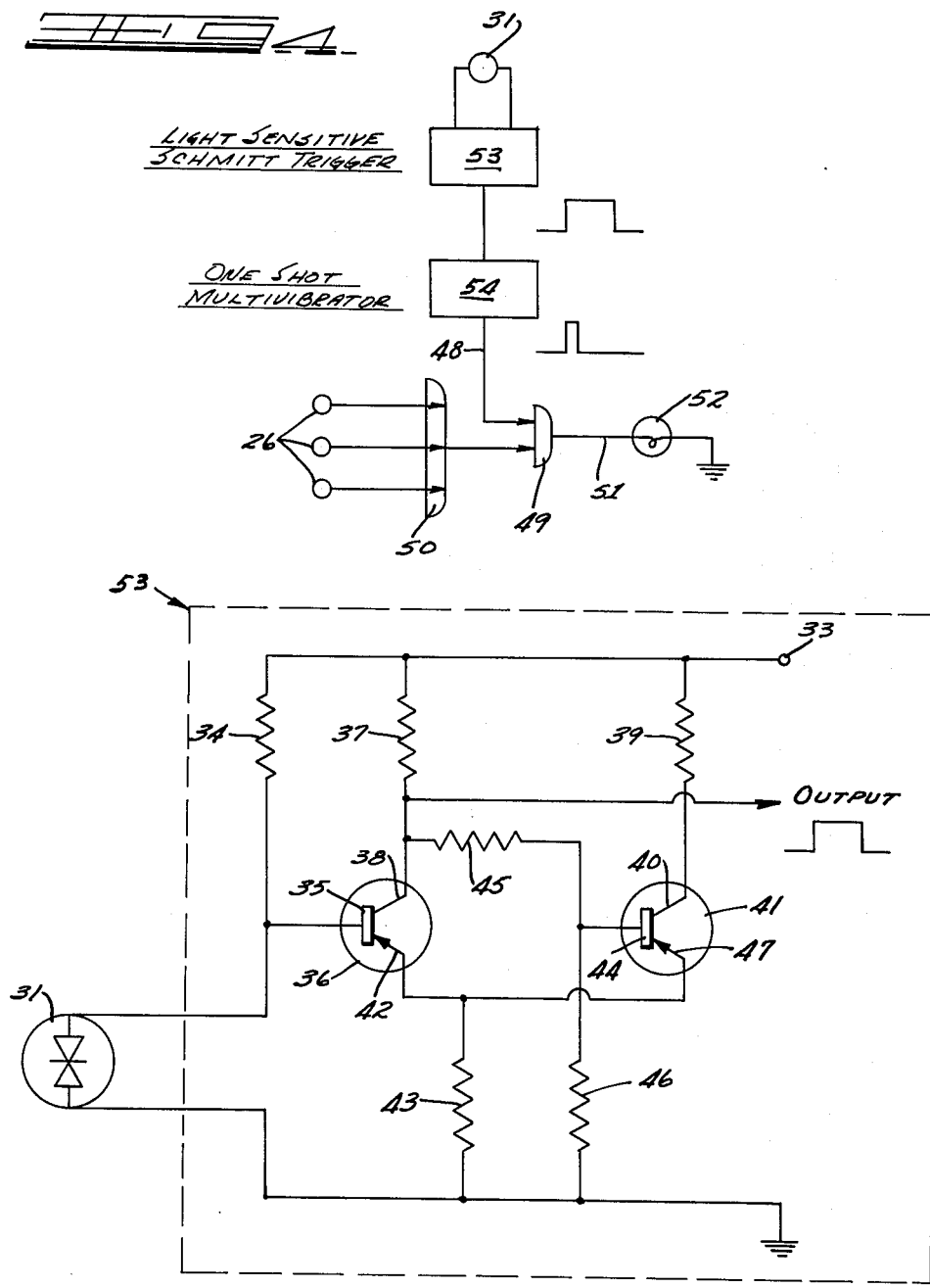

United States Patent Office 3,235,739
Patented Feb. 15, 1966

3,235,739
METHOD AND APPARATUS FOR INSPECTING CYLINDRICAL OBJECTS BY PHOTOSENSITIVE MEANS
Hans R. Rottmann, Toledo, Ohio, assignor to Owens-Illinois Glass Company, a corporation of Ohio
Filed Dec. 19, 1962, Ser. No. 245,800
7 Claims. (Cl. 250—223)

This invention relates to a method and apparatus for inspecting cylindrical containers for non-perpendicularity of their side wall with respect to their bases. More particularly, this invention relates to method and apparatus for inspecting vials by optical means for determining whether the side walls of the vial are perpendicular to the base.

The invention is capable of inspecting a plurality of vials that are continuously conveyed through an inspection zone without requiring that the vials be interrupted in their continuous movement. With the invention it is possible to check a large number of vials in a relatively short time, for example, 500 or more per minute.

It has been the practice in the past to gauge the concentricity of cylindrical objects by mechanical means in the form of rollers or feelers or by visual inspection which is always subject to fatigue on the part of the inspector so that over a period of time accurate inspection may not be possible. Furthermore, in the case of mechanical inspecting, it is necessary that the articles be stopped in their movement at an inspecting station, thus requiring considerable time to effect a single inspection.

With the foregoing in mind, it is an object of this invention to provide a method and apparatus for inspecting cylindrical objects to determine the perpendicularity of the side wall of the object in relation to its base.

It is an additional object of this invention to provide a method and apparatus for inspecting a great number of cylindrical articles successively without requiring the articles being physically contacted.

It is a still further object of this invention to provide a method and apparatus for optically inspecting a plurality of vials at a great rate, wherein the vials are continuously moved through the inspection zone without requiring interruption of movement.

Other and further objects will become apparent from the following description taken in conjunction with the annexed sheets of drawing, wherein:

FIG. 1 is a schematic vertical cross-sectional view of the apparatus of the invention;

FIG. 2 is a view similar to FIG. 1 illustrating the detection of a slanted vial;

FIG. 3 is a plan view of the apparatus of the invention with the pick-up units in cross-section;

FIG. 4 is a schematic circuit diagram of the electrical components necessary to provide a signal response;

FIG. 5 is a schematic circuit diagram of the light-sensitive Schmitt trigger.

Referring now to FIGS. 1 to 3, the apparatus of the invention comprises a conveyor, generally designated 10. For purposes of illustration, the conveyor is formed of a flat plate 11 having a recessed central area in its upper surface within which a conveyor belt 12 is adapted to slide. In this manner the belt 12 is crossed moved in a straight line throughout the length of the plate 11 and it should be understood that the belt 12 may be a continuous belt driven in any suitable manner at any desired speed. The articles or vials 13 to be inspected are placed in an upright position on the belt 12 and moved by the belt in the direction of the arrow 14 on FIG. 3. As the vials approach the inspection zone they are centered on the belt 12 by a pair of flexible, side-engaging spring members 15. These members serve as guides and exert little or no force on the side walls of the vials with the frictional engagement of the bottom of the vials on the belt being sufficient to move the vials between the members 15.

For purposes of illustration in FIG. 3, vials which are approaching the members 15 are shown slightly off center and those which have passed between the members 15 are positioned on the center of the belt and will pass through the inspection zone in a straight line with their side walls at a predetermined distance from the inspecting means.

Referring specifically to FIG. 1, the description of one of three optical inspecting means will be described. A generally cylindrical housing 16 has a light bulb 17 or other source of illumination mounted in one end thereof. A converging lens 18 is mounted within the housing 16 in front of the light 17 and serves to illuminate a slit 19 formed in a disc 20 mounted within the housing 16. A second lens 21 mounted in the forward end of the housing 16 is positioned so that its focal point coincides with the slit 19 and projects a parallel beam onto the side wall of the vial 13 which is in the gauging or inspecting zone. The lens 21 is intended to project a parallel beam of light onto the side of the wall of the vial where the light will be partially reflected in an inclined upward direction, as shown in FIG. 1. The reflected beam will fall on a converging lens 22 mounted within a cylindrical housing 23. The axis of the housing 23 is positioned or oriented at an angle with respect to the perpendicular side wall of a vial at an angle equal to the angle at which the axis of the housing 16 is positioned in relation to the side wall of the vial. The focal point 24 of the lens 22 is coincident with the positioning of a mask 25 mounted on a disc-shaped solar cell 26 which crosses the end of the housing 23. As can readily be seen when viewing FIG. 1, when the vial 13 has its side wall perpendicular to its base, the reflected beam will be focused by the lens 22 onto the mask 25. The mask 25 is shown as being circular in construction, however it may be rectangular, and its diameter corresponds to the tolerance by which the walls of the vials may depart from vertical without being rejected.

With particular reference to FIG. 2, the optical system is shown inspecting a vial which is slanted and it can be seen that the reflected light focused by the lens 22 now falls on the solar cell 26, thus energizing the cell providing a small electrical signal.

While the single light source and photo-electric pick-up has been described in detail, it can readily be seen by reference to FIG. 3 that there are three such inspecting systems arranged radially of the vial 13. Each of the systems is identical in construction and function, with the illumination of the side wall of the vial being in a plane directed toward the center of the vial. In other words, the vertical planes in which each of the three inspecting systems are located, will intersect at the central axis of the vial when positioned in the inspection zone.

Obviously, it is necessary that the gauging or inspecting stations be operational at the proper time from the standpoint that the vial must be in a particular location at the time that the signals from any one of the three photosensitive devices 26 are of significance. During the movement of a vial through the inspection zone or inspection position, it is possible that erroneous readings might be provided if a suitable gate or means is not provided for determining when the vial is in gauging position. Therefore, a housing 27, having a light 28 therein, has a lens 29 in front of the light and will direct a beam of light across the path of travel of the vials 13. This beam normally is viewed by a lens 30 which will focus the beam onto a photo-sensitive pick-up 31, with the lens and pick-up both carried by a housing 32.

The photo-sensitive pick-up 31 is a double anode silicon photo-resistor element. This element is a commercial item of the Texas Instrument Company sold under the designation 1N2175. In effect, this element 31 effectively operates as a resistance element, whose resistance varies as the amount of light falling thereon changes. When no light is falling on the element, substantially no current will flow therethrough. There will be some slight leakage of the current therethrough, but substantially the element 31 acts as an open switch. As increasing amounts of light fall on the element 31, it becomes, in effect, more and more conductive.

With particular reference to FIG. 5, the operation of the light-sensitive Schmitt trigger 53 will be described. As the glass articles move along the conveyor 12 into position to intercept the beam of light extending across the conveyor and falling on the element 31, the vials 13 will interrupt the beam of light and under this condition the photo-resistor element 31 will be blocked. With a voltage source, for example, —12 volts connected to the terminal 33, current will flow through resistor 34 to the base 35 of the transistor 36, with the voltage on the base 35 being approximately —1.2 volts. Current also will flow through a resistor 37 which is connected to the collector 38 of the transistor 36. The voltage across the resistor 37 will be approximately —1.5 volts. The current flowing through the resistor 37 into the collector 38 will be transmitted through the transistor to the emitter 42 which is connected to ground potential through a resistor 43. The voltage drop across the resistor 43 is approximately —1 volt. The —1.2 volts applied to the base 35 of the transistor 36 is sufficient to cause saturation of the transistor, thus rendering it conductive and resulting in flow of current through the resistor 37 to the collector 38 and from the emitter 42 through the resistor 43.

As previously stated, —1.5 volts is present at the collector 38 and this voltage is applied to the base 44 of the transistor 41 through a voltage divider circuit comprised of resistors 45 and 46. Thus, the voltage on the base 44 will be approximately —.75 volt. The emitter 42 of the transistor 36 is coupled to the emitter 47 of the transistor 41 and will have —1 volt impressed thereon. In view of the fact that the voltage at the emitter 41 is greater than the voltage on the base 44, the transisor 41 will be non-conducive and the voltage across the resistor 39 will be approximately —12 volts. It should be kept in mind that the foregoing conditions and voltages are present in the circuit when the photo-resistor element 31 is not exposed to light. When light falls on the element 31, part of the current flowing through resistor 34 will now pass through the element 31, thus reducing the current applied to the base 35 of the transistor 36. As the voltage drops on the base 35, to the point where it is less than the voltage on the emitter 42, the transistor 36 will be rendered non-conductive and the voltage across the resistor 37 will build up and concurrently therewith the voltage on the base 44 of the transistor 41 will likewise build up until such time as the voltage on the base 44 exceeds the voltage on the emitter 47. Obviously, the voltage on the emitter 47 also will be dropping, since it is coupled to the emitter 42 of the transistor 36. When the voltage on the base 44 exceeds the voltage on the emitter 47 the transistor 41 will become conductive and the voltage on the collector 40 will also swing from —12 volts to approximately —1.5 volts. However, as soon as the transistor 41 becomes conductive, the voltage on the emitter 47 will hold the transistor 36 in an off condition.

Thus, it can be seen that the output of the light-sensitive Schmitt trigger 53 has a positive-going output step whose level moves from —12 volts when the photo-resistor element 31 is exposed to light to —1.5 volts when the element 31 is blocked. The output signal, however, will remain at —1.5 volts during the entire period that the vial is intercepting the beam of light extending across the conveyor. Therefore, in order to be certain that an "and" gate 49 is provided with an input signal of short duration corresponding to the positioning of a vial at a specific point in relation to the optical inspecting system, the output signal from the Schmitt trigger 53 is fed to a one-shot multivibrator 54. As indicated in FIG. 4, the output of the one-shot multivibrator will be in the form of a single pulse of limited duration. The one-shot multivibrator is sold by Engineered Electronics Company, of Santa Anna, California under the designation T–105 described in their catalog No. 859, dated December 1, 1961. The "and" gate 49 may be one-half of the type disclosed by Engineered Electronics Company in their catalog T72 at page 47 under the designation T–404. This output signal, as indicated in FIG. 4, is connected to one of the inputs of the "and" gate 49. The other input of the "and" gate 49 is connected to the output of an "or" gate 50. This "or" gate 50 may be of the type disclosed by Engineered Electronics Company in their catalog T72 at page 51 under the designation T–407. While this catalog disclosure shows a four input "or" gate, it should be understood that it will operate satisfactorily with only three of the inputs connected to signal sources. The "or" gate 50 is connected to the three photo-sensitive elements 26. Thus, it can be seen that a signal from any one of the photo-sensitive elements 26 will pass through the "or" gate 50 and provide an input signal to the "and" gate 49. However, the "and" gate will pass a signal to its output 51 only at the time that a signal is received from the light-sensitive Schmitt trigger 53 and multivibrator 54. If the vial has perpendicular side walls with respect to the base, no signal will be received from the three solar cells or photo-sensitive elements 26. Thus, no output signal will be given by the "or" gate 50 and the "and" gate 49 will not pass the signal from the multivibrator 54. When a vial which is not perpendicular has moved into inspection zone, one or more of the solar cells 26 will be energized and the "or" gate 50 will have its output signal being fed to one input of the "and" gate 49. This, coupled with the arrival of the signal from the one-shot multivibrator 54, will result in a signal passing through the "and" gate to an indicator light 52, thus indicating the presence of a vial which has a slant bottom.

With the particular physical setup of the optical gauging system and the optically energized gating system, the Schmitt trigger 53 will have a positive-going output signal as soon as the forward edge of the vial intercepts the beam of light extending across the conveyor to an extent sufficient to cause the photo-resistor element 31 to no longer conduct appreciable current therethrough.

Obviously, the output signal from the "and" gate 49 may be utilized to actuate suitable reject mechanism rather than an indicator light. For example, the output signal from the "and" gate could operate a valve through a delay circuit, the valve being the control for an air jet positioned adjacent the conveyor and utilized to eject vials which are defective from the conveyor.

Various modifications may be resorted to within the spirit and scope of the appended claims.

I claim:

1. The method of inspecting a plurality of containers in succession for determining those having slant bottoms, comprising the steps of continuously moving a series of containers through an inspection zone, directing a first beam of light at an oblique angle against the side wall of the container in a first vertical, radial plane with respect to the axis of said container, simultaneously; directing a second incident light beam of substantially constant intensity obliquely against the container side wall in a second vertical, radial plane with respect to the axis of said container, simultaneously directing a third incident light beam of substantially constant intensity obliquely against the side wall of said container in a third vertical radial plane with respect to the axis of said container, viewing the specular reflections from the side wall of said container at a point in each of said three planes, and determining the deviation of the specular reflections from the point in each plane as an indication of the non-perpendicularity of the side wall of the container with respect to its bottom.

2. The method of checking a container to determine whether the cylindrical side walls thereof are perpendicular to the base, comprising moving said container continuously in a predetermined path, causing said container to intercept a transverse beam of radiant energy as it is moved continuously in said path, positioning a photo-sensitive means in the path of the beam to thereby cause a first signal when the container enters said beam, directing a plurality of beams of radiant energy at an acute angle to the axis of the container against the side wall of the container in radial, vertical planes, positioning a plurality of corresponding radiation detecting means so as to receive specular reflections from the container side wall, masking the central portion of each of said plurality of radiation detecting means such that specular reflections will fall on the masks if the container has perpendicular side walls with respect to the base, and creating a second signal by an improper relationship of the beams to their respective radiation detecting means during the interval of said first signal when a condition of nonperpendicularity exists.

3. The method of checking a container to determine whether the cylindrical side walls thereof are perpendicular to the base, comprising moving said containers continuously in a predetermined path, causing said container to intercept a transverse beam of light as it is moved continuously in said path, positioning a photo-resistor in the path of the beam and thereby causing a voltage pulse in a Schmitt trigger circuit containing said photo-resistor when the container enters said beam, directing a plurality of beams of light at an acute angle to the axis of the container against the side wall of the container and on spaced radial thereof, when the container intercepts said transverse beam, positioning a plurality of corresponding light sensitive cells at complementary acute angles with respect to the axis of said container for receiving specular reflections from the container side wall, masking the portion of each said cell which normally would be illuminated by specular reflections when the container has perpendicular side walls with respect to the base, creating a voltage signal from said light sensitive cells in the event the container has nonperpendicular side walls, and gating said voltage signal with said voltage pulse.

4. Apparatus for inspecting vials comprising means for conveying relatively spaced vials along a horizontal surface, a first source of radiation mounted adjacent said surface, means for directing a beam of light from said first source at an oblique angle to the vertical axis of the vial wall, means for viewing the specular reflections of said first beam from the vial wall, a second source of radiation, means for directing a beam of light from said second source at an oblique angle to the vertical axis of the vial against the wall thereof, means for viewing the specular reflections of the second beam from the vial side wall, a third source of radiation, means for directing a beam of light from said third source at an oblique angle to the axis of the vial against the vial wall, means for viewing the specular reflections of the third beam from the side wall, said beams being directed toward the side wall of the vial with their respective viewing means being in radially spaced vertical planes about the axis of the vial, said means for viewing the specular reflections, of first, second and third beams providing signals responsive to the specular reflections, means for combining the signals received from said three viewing means, means responsive to the movement of the vial into the inspecting position for passing a signal from said combining means to an indicator, whereby deviation of the side wall of the container vial from the perpendicular will operate said indicator means.

5. Apparatus for detecting slant bottom vials comprising means for conveying said vials in an upright position in succession through an inspection zone, three sources of radiation mounted adjacent said inspection zone, means for directing a beam of radiation from each source against a side wall of the vial in the inspection zone at an oblique angle and in radial planes which are coincident with the vertical axis of the said vial, each directing means being positioned below the path of travel of the vials, radiation detecting means mounted above each directing means for receiving specular reflections from said vial side wall, each detecting means comprising a condensing lens mounted at the forward end of a cylindrical housing, a photo-sensitive end wall forming the opposite end of said housing, an opaque mask fixed to the face of the end wall with said lens normally focusing specular reflections from the vial side wall onto said mask, an "or" gate, means connecting the input of said "or" gate to the three radiation sensitive end walls, a further light source providing a beam of radiation extending normal to the path of travel of said vials, photoelectric means mounted in light receiving position on the opposite side of said path of travel, said photoelectric means being connected to one input of an "and" gate, means connecting the output of the "or" gate to a second input to said "and" gate, and signal means connected to the output of said "and" gate.

6. Apparatus for detecting non-perpendicularity of the base of a container with respect to its side wall which comprises conveyor means for moving a plurality of said containers continuously in a predetermined path past an inspection station, a first source of radiant energy mounted adjacent said inspection station for directing a beam of radiant energy transversely of the path of said containers, in position to be intercepted by said containers, a photo-resistor positioned with its line of sight in position to intercept said beam of radiant energy, means connected to said photo-resistor for producing a gating voltage pulse when a container interrupts the beam at the inspection station, a plurality of additional sources of radiant energy, means at said inspection station for directing beams of radiant energy from said sources against the side wall of the container at the inspection station, a plurality of photo-detectors positioned at said station relative to the plurality of beams in such a manner that the specular reflections from the side wall of the container will fall on said photo-detectors when the container is at the inspection station, opaque masking means overlying a portion of each photo-detector such that when the container side wall is perpendicular to the base the specular reflections will fall on the masks and indicator means connected to said photo-detectors and operable when said container wall is non-perpendicular with respect to the base.

7. Apparatus for detecting non-perpendicularity of the base of a container with respect to its side wall which comprises conveyor means for moving said container continuously in a predetermined path past an inspection station, a first source of light mounted adajacent said inspection station for directing a beam of light transversely of the path of said container in position to be intercepted by said container, a photo-resistor positioned with its line of sight in position to receive said beam of light, means connected to said photo-resistor for producing a gating voltage pulse when the container interrupts the beam at the inspection station, a plurality of additional sources of light at said inspection station adapted to direct beams of light against the side wall of the container, a plurality of associated photo-detectors positioned relative to the plurality of beams in such a manner that the specular reflections from the side wall of the container will fall on said photo-detectors when the container is at the inspection station, masking means overlying a portion of each photo-detector such that when the container side wall is perpendicular to the base the specular reflections will fall on the masks and when said container wall is non-perpendicular with respect to the base the reflections will fall on the unmasked portion of the photo-detector and the plurality of detectors will produce a signal voltage, gate means connected to receive said signal voltage and said gating voltage pulse, said gate operating to pass said signal voltage when receiving said gating voltage pulse and indicating means connected to said gate means whereby said indicator will provide an indication when the container is faulty and no indication when the container is acceptable.

References Cited by the Examiner

UNITED STATES PATENTS

| | | | |
|---|---|---|---|
| 2,446,628 | 8/1948 | Brown | 209—111 |
| 2,524,929 | 10/1950 | Razek | 209—111 |
| 2,735,331 | 2/1956 | McMaster et al. | 250—223 X |
| 2,971,646 | 2/1961 | Coffey | 209—111 |
| 3,089,594 | 5/1963 | Early | 209—111 |

FOREIGN PATENTS

| | | |
|---|---|---|
| 712,421 | 7/1954 | Great Britain. |

RALPH G. NILSON, *Primary Examiner.*

WALTER STOLWEIN, *Examiner.*